United States Patent
Yagisawa

(10) Patent No.: US 7,255,243 B2
(45) Date of Patent: Aug. 14, 2007

(54) PURE WATER TANK FOR FUEL CELL SYSTEM

(75) Inventor: Kenji Yagisawa, Sano (JP)

(73) Assignee: Calsonic Kansei Corporation (JP)

( * ) Notice: Subject to any disclaimer, the term of this patent is extended or adjusted under 35 U.S.C. 154(b) by 610 days.

(21) Appl. No.: 10/806,622

(22) Filed: Mar. 23, 2004

(65) Prior Publication Data

US 2005/0035127 A1    Feb. 17, 2005

(30) Foreign Application Priority Data

Mar. 28, 2003   (JP)   ............................ P2003-092493

(51) Int. Cl.
  *B65D 90/02*   (2006.01)
  *H01M 8/04*   (2006.01)
  *H01M 8/12*   (2006.01)

(52) U.S. Cl. .................... 220/565; 220/592.01; 429/26

(58) Field of Classification Search ................ 220/565, 220/592.01; 429/26
  See application file for complete search history.

(56) References Cited

U.S. PATENT DOCUMENTS 6,318,114 B1   11/2001   Slaughter

FOREIGN PATENT DOCUMENTS

| EP | 1 406 330 A | 4/2004 |
|---|---|---|
| JP | 2000-149970 | 5/2000 |
| WO | WO82/03677 A | 10/1982 |
| WO | WO 2004/021493 A | 3/2004 |

*Primary Examiner*—Anthony D. Stashick
*Assistant Examiner*—Harry A. Grosso
(74) *Attorney, Agent, or Firm*—Kilpatrick Stockton LLP

(57) ABSTRACT

A pure water tank reduces stress to be applied to the tank when pure water in the tank freezes, to thereby prevent the deformation or breakage of the tank without thickening the wall of the tank. The tank has inner side-walls to define a pure water zone. On the outer side of the inner side-walls, an antifreeze zone is defined. The antifreeze zone holds antifreeze having a freezing point lower than a lowest temperature of a service temperature range of the tank. The density of the antifreeze increases as the temperature thereof decreases. The width of the antifreeze zone is set to satisfy $D \geq \alpha \log_e(H) + d_0$, where H is the height of the antifreeze zone.

4 Claims, 8 Drawing Sheets

PURE WATER TANK FOR FUEL CELL SYSTEM

BACKGROUND OF THE INVENTION

1. Field of the Invention

The present invention relates to a pure water tank for a fuel cell system.

2. Description of the Related Art

A fuel cell system uses pure water to humidify fuel gas and oxidizing gas supplied to a fuel cell stack. Pure water in a pure water tank for the fuel cell system freezes in a case where a vehicle equipped with the fuel cell system is parked for a long time in cold climates.

To improve the starting ability of the fuel cell system, the pure water in the pure water tank must be thawed as quickly as possible. To thaw the pure water, one related art divides the pure water tank into a large main tank and a small supplementary tank and heats the main tank with warmed coolant and the supplementary tank with a heater.

SUMMARY OF THE INVENTION

The related art assumes that the pure water in the pure water tank is frozen and simply thaws the frozen pure water in the tank. The related art provides no consideration to an influence of stress caused by freezing pure water on the side walls of the tank. When pure water in a pure water tank freezes, a part of the pure water that is in contact with the side walls of the tank starts to freeze firstly. Thereafter, the surface of the pure water freezes to cover the top face of the pure water with ice, and lastly, a central part of the pure water in the tank freezes. When the central part of the pure water freezes, the whole volume of the ice increases. At this stage, the ice is unable to swell toward the top face thereof, and therefore, applies large stress to the tank to deform or break the tank. To prevent such problems, the wall of the tank must be thickened. However, this causes a problem of increasing the size and weight of the tank.

The present invention solves the problem of the related art and provide a pure water tank for a fuel cell system, being capable of reducing stress produced in the tank when pure water in the tank freezes and preventing the deformation and breakage of the tank without thickening the wall of the tank.

A first aspect of the present invention provides a pure water tank for a fuel cell system, having a pure water zone configured to hold pure water and have an upper space not filled with the pure water and an antifreeze zone being secured on the outer side of the pure water zone and configured to hold antifreeze. The antifreeze has a freezing point lower than a lowest temperature of a service temperature range of the pure water tank. The density of the antifreeze increases as the temperature thereof decreases within the service temperature range.

A second aspect of the present invention sets the width of the antifreeze zone according to the height thereof so that the pure water in the pure water zone may gradually freeze from the bottom portion thereof in the service temperature range.

DESCRIPTION OF THE PREFERRED EMBODIMENT

Embodiments of the present invention will be explained with reference to the drawings.

Figure 1:
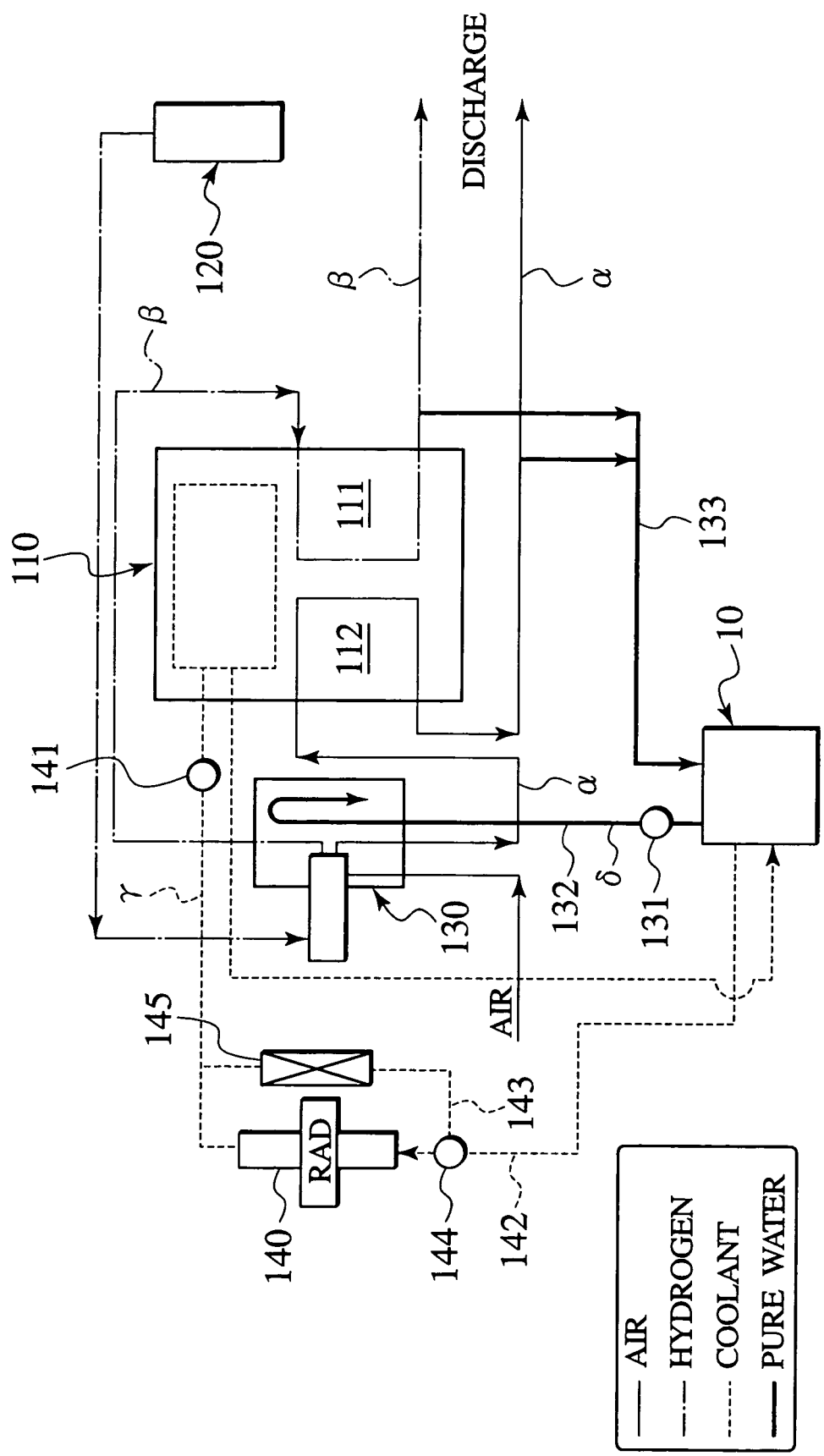
FIG. 1 is a schematic view showing a fuel cell system having a pure water tank according to a first embodiment of the present invention.
Figure 2A:
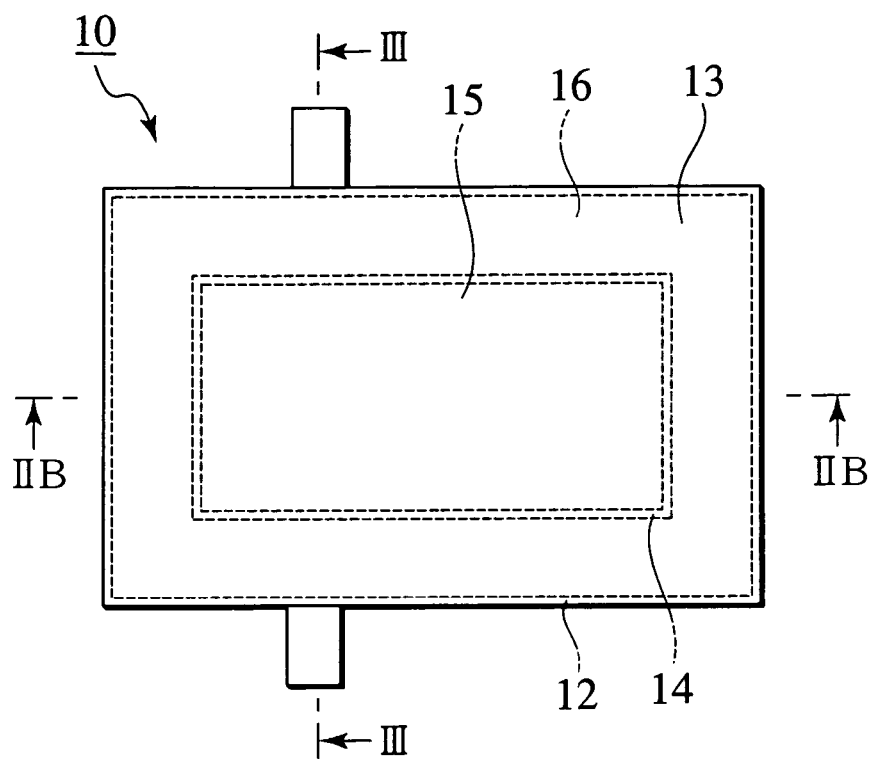
FIG. 2A is a plan view showing the pure water tank of the first embodiment.
Figure 2B:
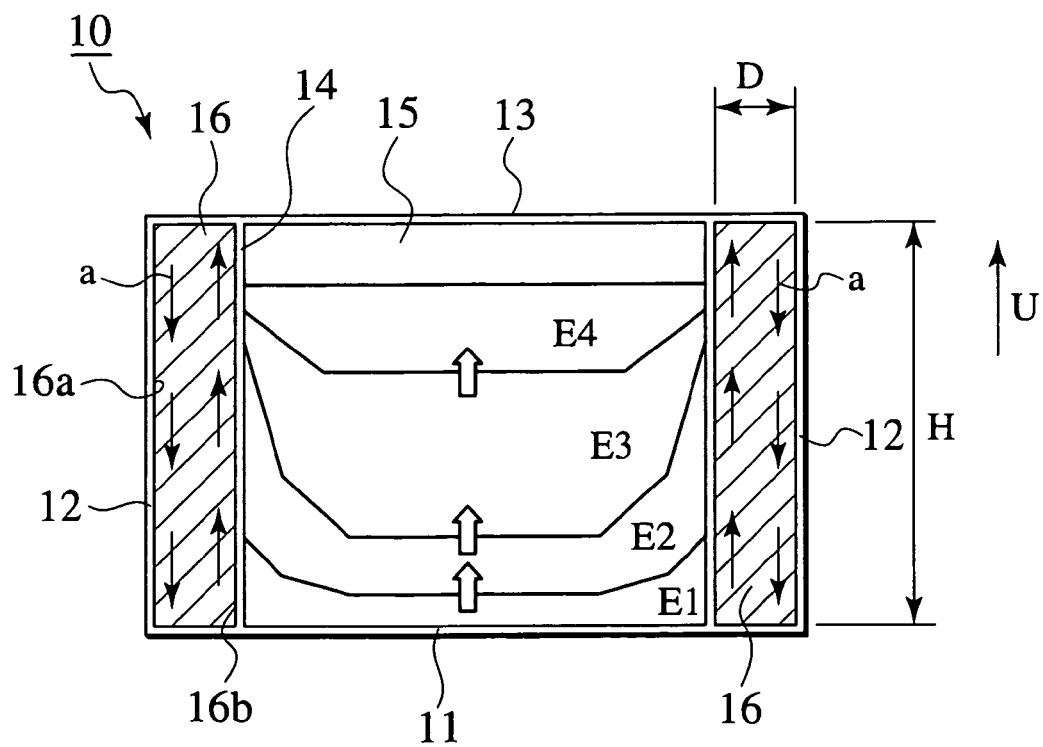
FIG. 2B is a sectional view taken along a line IIB-IIB of FIG. 2A.
Figure 3:
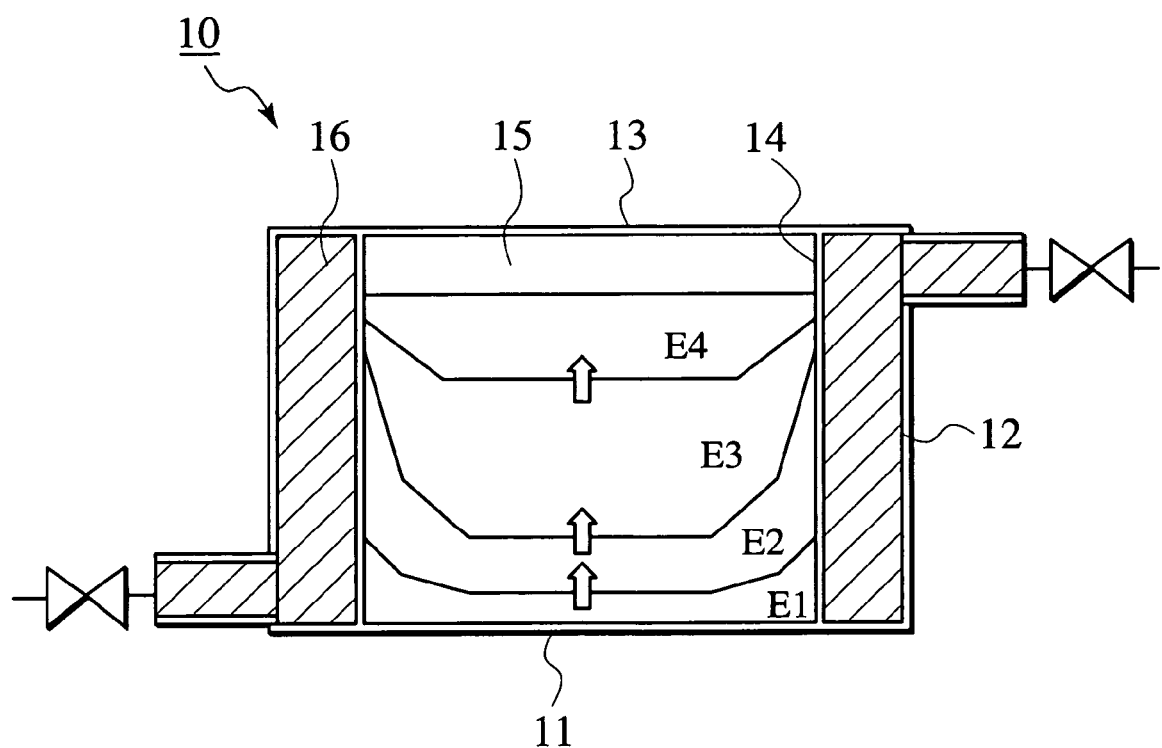
FIG. 3 is a sectional view taken along a line III-III of FIG. 2A.
Figure 4:
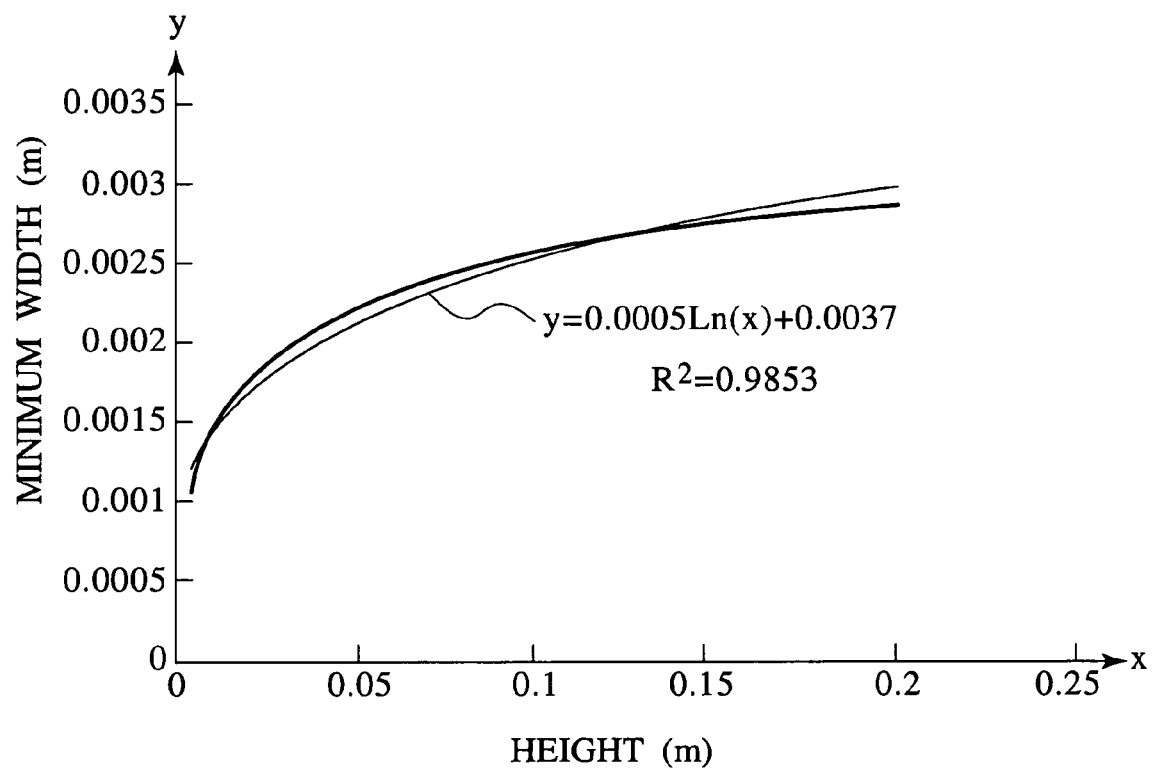
FIG. 4 is a graph showing a characteristic curve of minimum required widths to heights of an antifreeze zone necessary to successively freeze pure water from the bottom to the top thereof according to the first embodiment.

FIGS. 1 to 4 show a pure water tank for a fuel cell system according to the first embodiment of the present invention, in which FIG. 1 is a schematic view showing the fuel cell system having the pure water tank 10 of the first embodiment, FIG. 2A a plan view showing the pure water tank 10, FIG. 2B a sectional view taken along a line IIB-IIB of FIG. 2A, FIG. 3 a sectional view taken along a line III-III of FIG. 2A, and FIG. 4 a graph showing a characteristic curve of minimum required widths to heights of an antifreeze zone necessary to successively freeze pure water from the bottom to the top thereof.

In FIG. 1, a fuel cell stack 110 has a fuel electrode 111 to which pure hydrogen serving as fuel gas is introduced from a compressed hydrogen tank 120 and an air electrode 112 to which air serving as oxidizing gas is introduced from the outside. The pure hydrogen being introduced to the fuel electrode 111 and the oxygen being introduced to the air electrode 112 are reacted through an electrolytic film (not shown) to generate electricity.

The hydrogen and air being supplied to the fuel cell stack 110 are humidified in a humidifier 130 to promote the electricity generating reaction and prevent the deterioration of the electrolytic film. The humidifier 130 receives purified water from the pure water tank 10 through a pure water guide pipe 132 and a pure water pump 131.

In a case where a vehicle equipped with the fuel cell system is parked for a long time under subzero temperatures, components such as the fuel cell stack 110 will break due to freezing pure water. To cope with this problem, pure water in a pure water path is extracted when the vehicle is parked. The extracted pure water is stored in the pure water tank 10.

The fuel cell stack 110 produces heat when generating electricity. Accordingly, the fuel cell stack 110 is cooled by circulating the coolant through a radiator 140, the fuel cell stack 110, and a coolant pump 141. The coolant circulated through the radiator 140 and fuel cell stack 110 is antifreeze.

A coolant path 142 has a bypass 143 and a three-way valve 144 to make the coolant bypass the radiator 140 only at the start of the fuel cell system.

The bypass 143 has a heater 145, which may be an electric heater or a heater using hydrogen fuel heat, to heat the antifreeze and warms up the fuel cell stack 110.

In FIG. 1, a thin continuous line α represents an air path, a dash-and-dot line β a hydrogen path, a dotted line γ an antifreeze path, and a thick continuous line δ a humidifying pure water path.

In FIGS. 2A, 2B, and 3, the pure water tank 10 has a bottom wall 11, four outer side-walls 12, and a top wall 13. These walls define the periphery of the tank 10. On the inner side of the four outer side-walls 12, there are inner side-walls 14, which keep the same distance from the outer side-walls 12 and are parallel to the outer side-walls 12. The tank 10 holds pure water and has an upper space which is not occupied by the pure water. If the pure water freezes, the upper space absorbs a change in the volume of the pure water. Here, the "upper" means a direction as depicted by an arrow mark U and corresponds to a direction opposite to the direction in which gravity works or in which potential energy increases due to, for example, centrifugal force.

The pure water tank 10 has a pure water zone 15 surrounded by the inner side-walls 14 and an antifreeze zone 16 surrounded by the inner side-walls 14 and outer side-walls 12. Namely, the antifreeze zone 16 is formed around the pure water zone 15.

The pure water zone 15 holds pure water, and the antifreeze zone 16 holds antifreeze. The antifreeze has a freezing point lower than a lowest temperature of a service temperature range of the pure water tank 10, and the density of the antifreeze increases as the temperature thereof decreases.

An antifreeze on or in the vicinity of the lower-temperature outer side 16a and an antifreeze on or in the vicinity of the higher-temperature inner side 16b are referred to as an antifreeze in the lower temperature side and an antifreeze in the higher temperature side hereafter, respectively. In a case where an ambient temperature decreases below an ice point, the temperature of an outer side 16a of the antifreeze zone 16 decreases, and the temperature of an inner side 16b thereof relatively increases. Then, the antifreeze in the lower temperature side increases in density, and therefore, descends in the antifreeze zone 16.

At the same time, the antifreeze in the high temperature side relatively decreases in density to the antifreeze in the low temperature side, and therefore, ascends in the antifreeze zone 16. Consequently, a temperature difference between the inner and outer sides of the antifreeze zone 16 produces a natural convection as depicted by arrow marks "a" in FIG. 2B. The natural convection settles to form a high-temperature area at an upper part of the antifreeze zone 16 and a low-temperature area at a lower part of the same.

Each of the descending and ascending flows forms a boundary layer having a given width. If the descending and ascending flows are provided with boundary conditions that the boundary layers of the flows interfere with each other, the convection and an effective movement according to the thermal energy will be hindered. The thickness of each boundary layer is a function of the kinetic viscosity coefficient, heat transfer coefficient, and volume expansion coefficient of the antifreeze, a temperature difference between the outside and inside of the antifreeze zone 16, the height of the antifreeze zone 16, and the like. The present inventor assumed that a highly efficient natural convection would occur in the antifreeze if conditions were set to avoid an interference between the ascending and descending antifreeze flows. On a condition that the sum of the thicknesses of the boundary layers must not exceed a width D of the antifreeze zone 16, the present inventor studied optimum boundary conditions for the antifreeze zone 16. Eventually, the inventor found that the optimum boundary conditions are expressible with the following expression (1) using the height H [m] and width D [m] of the antifreeze zone 16:

$$D \geq \alpha \log_e H + d_0 \quad (1)$$

A minimum width of the antifreeze zone 16 is defined as $Dmin = \alpha \log_e H + d_0$. Then, a natural convection to realize high heat exchange efficiency will occur by designing the width D of the antifreeze zone 16 as $D \geq Dmin$. Here, the parameters α and $d_0$ are constants determined by the properties of the antifreeze, a temperature difference between the outside and inside of the antifreeze zone 16, and the like. The width D of the antifreeze zone 16 is set according to the height H of the antifreeze zone 16 so that pure water may gradually freeze from the bottom portion thereof in actual use. More precisely, the minimum width Dmin is increased in response to an increase in the height H, and a variation $\Delta Dmin (= Dmin - d_0)$ in the minimum width Dmin is proportional to a logarithm of the height H as expressed with the following expression (2)

$$\Delta Dmin = \alpha \log_e H \quad (2)$$

When the relationship expressed by (1) is satisfied, an upper part of the antifreeze zone 16 forms a high-temperature area and a lower part thereof a low-temperature area. This temperature distribution is transferred to the pure water in the pure water zone 15 through the inner side-walls 14. As a result, the pure water zone 15 shows a temperature distribution involving a high-temperature upper part and a low-temperature lower part. Then, the pure water in the pure water zone 15 starts to freeze from the bottom portion thereof, and the top portion thereof freezes later. FIGS. 2B and 3 show temporal freezing areas E1, E2, E3, and E4 of the pure water in the pure water zone 15. The areas E1, E2, E3, and E4 freeze in the order thereof.

When pure water at a lower part (areas E1, E2, and E3) freezes, pure water at an upper part is still in a liquid state, and therefore, the freezing pure water can swell upward. This results in reducing stress applied to the pure water tank 10 when pure water at a lower part of the pure water zone 15 freezes. Namely, the deformation or breakage of the tank 10 due to freezing pure water can be prevented without thickening the wall of the tank 10. It is possible to thin the wall of the tank 10, to reduce the size and weight of the tank 10.

According to the first embodiment, the width D [m] of the antifreeze (coolant) zone 16 is set to be greater than the minimum width Dmin. FIG. 4 shows an actually measured characteristic curve of the minimum width Dmin expressed as a function of the height of the coolant zone 16. The width Dmin is a minimum width in a condition where the pure water in the pure water zone 15 is secured to gradually freezed from the bottom portion toward the top portion thereof. This characteristic curve was measured at an ambient temperature of −30 degrees centigrade without wind with the use of antifreeze (coolant) made of a mixed solution of 50% ethylene glycol and pure water. This characteristic curve well agrees with a theoretical characteristic curve of $y = 0.0005 \cdot Ln(x) + 0.0037$ based on the expression (1), where $Ln(x) \equiv \log_e x$. Namely, the coolant zone having the width D [m] designed according to the expression (1) with $\alpha = 0.0005$ [m] and $d_0 = 0.0037$ [m] allows the pure water in the pure water zone 15 to surely freeze from the bottom portion to the top portion thereof. This results in surely reducing stress applied to the pure water tank 10 when pure water at a lower part of the pure water zone 15 freezes. To solve the expression (1) from the parameters α and $d_0$, the parameters α and $d_0$ can be determined according to the properties of the coolant. Alternatively, optimum values for the parameters may be estimated from data on an actually measured characteristic curve. An important fact is that employing the expressions (1) and (2) allows the conditions for generating an effective natural convection to be set from the designing of dimensions (H and D) of the antifreeze (coolant) zone 16.

It is preferable that the inner side-walls 14 are made of material having a high heat transfer coefficient so that heat of the antifreeze in the antifreeze zone 16 is quickly transferred to the pure water in the pure water zone 15. Also, it is preferable that the outer side-walls 12 are made of material having a low heat exchange effectiveness to insulate the inside of the pure water tank 10 from the atmosphere.

Second Embodiment

Figure 5:
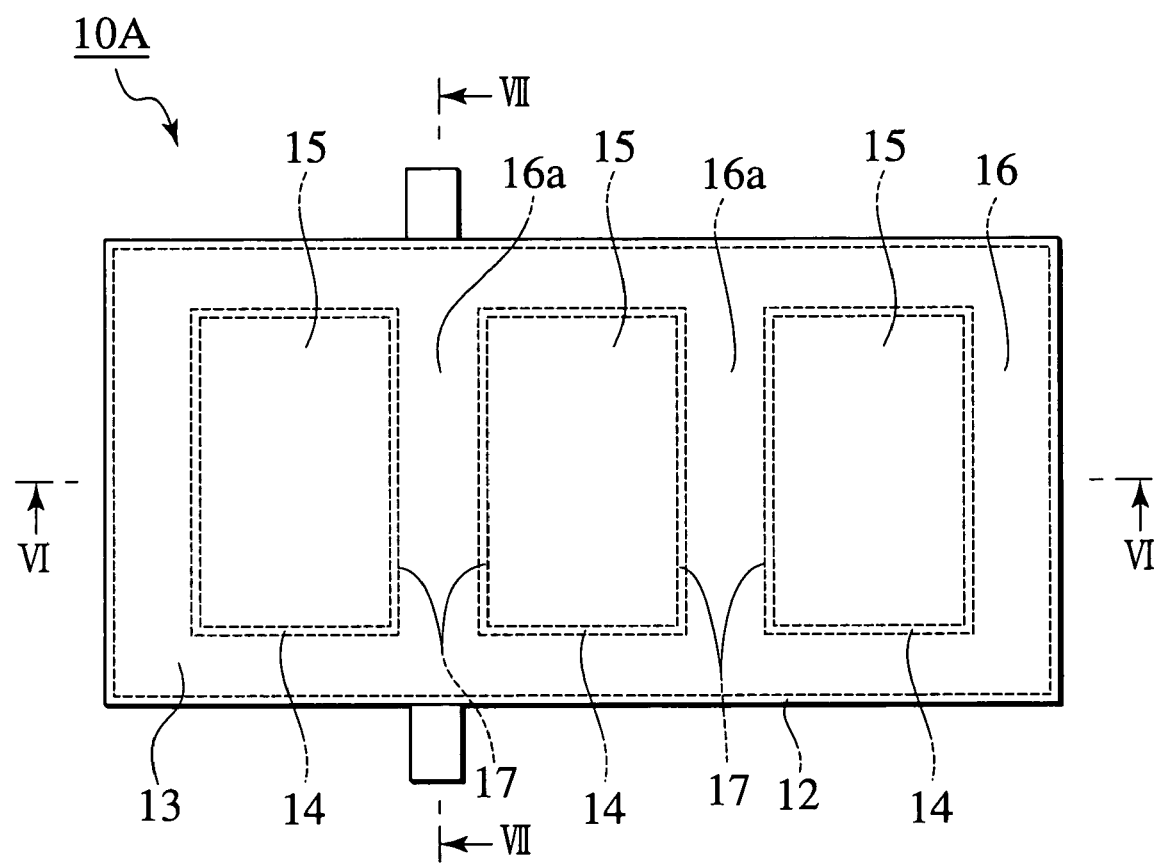
FIG. 5 is a plan view showing a pure water tank according to a second embodiment of the present invention.
Figure 6:
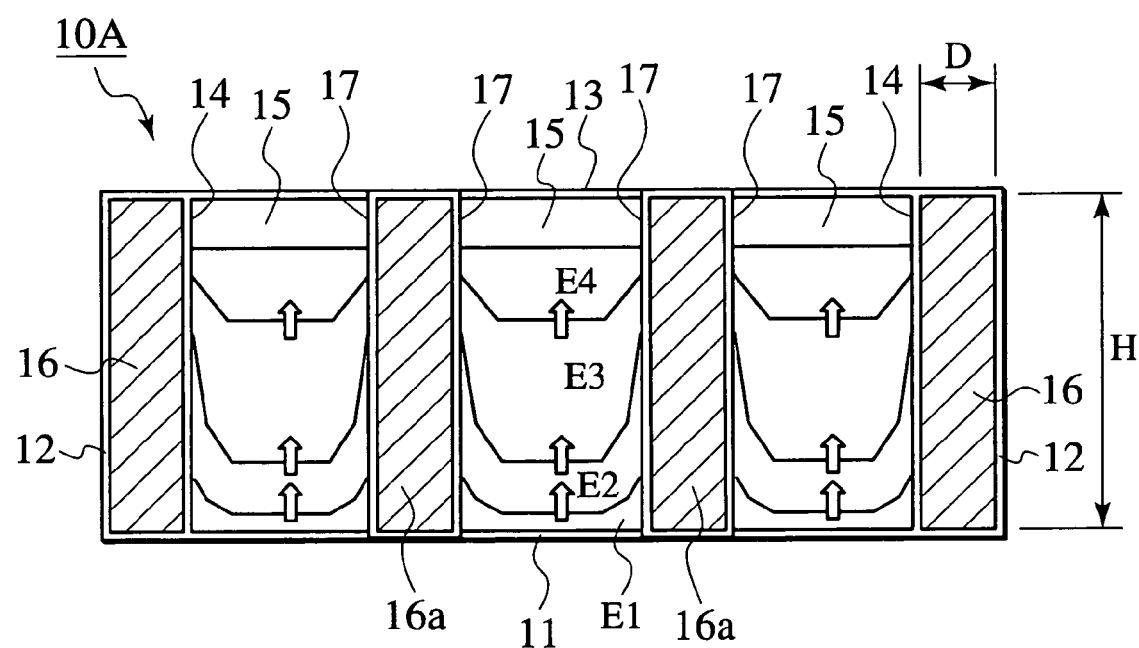
FIG. 6 is a sectional view taken along a line VI-VI of FIG. 5.
Figure 7:
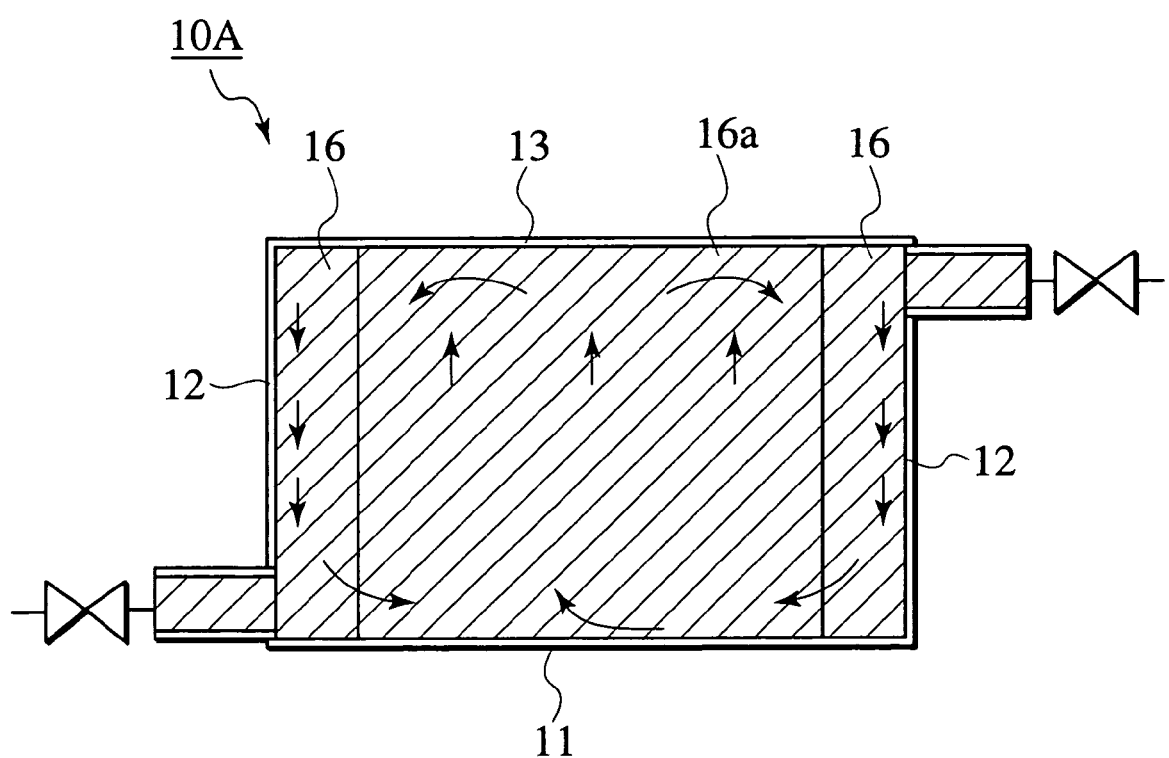
FIG. 7 is a sectional view taken along a line VII-VII of FIG. 5.

FIGS. 5 to 7 show a pure water tank for a fuel cell system according to the second embodiment of the present invention, in which FIG. 5 is a plan view showing the pure water tank 10A, FIG. 6 a sectional view taken along a line VI-VI of FIG. 5, and FIG. 7 a sectional view taken along a line VII-VII of FIG. 5.

In FIGS. 5 to 7, a pure water zone 15 is formed inside an antifreeze zone 16 in the pure water tank 10A, like the first embodiment. Unlike the first embodiment, the pure water zone 15 is divided into three parts with connection walls 17. The connection walls 17 define connection parts 16a of the antifreeze zone 16. The other arrangements of the second embodiment are the same as those of the first embodiment, and therefore, the same parts as those of the first embodiment are represented with like reference marks to avoid repetitive explanation.

According to the second embodiment, the area of side faces through which the pure water zone 15 and antifreeze zone 16 contact each other is large. This configuration relaxes temperature gradient and widely promotes heat exchange between pure water in the pure water zone 15 and antifreeze in the antifreeze zone 16. Consequently, the pure water in the pure water zone 15 may surely freeze from the bottom portion to the top portion thereof. Namely, stress to be applied to the pure water tank 10A, when pure water at a lower part of the pure water zone 15 freezes, surely decreases. The pure water tank 10A according to the second embodiment is effective when the volume of the pure water zone 15 is large.

Third Embodiment

Figure 8:
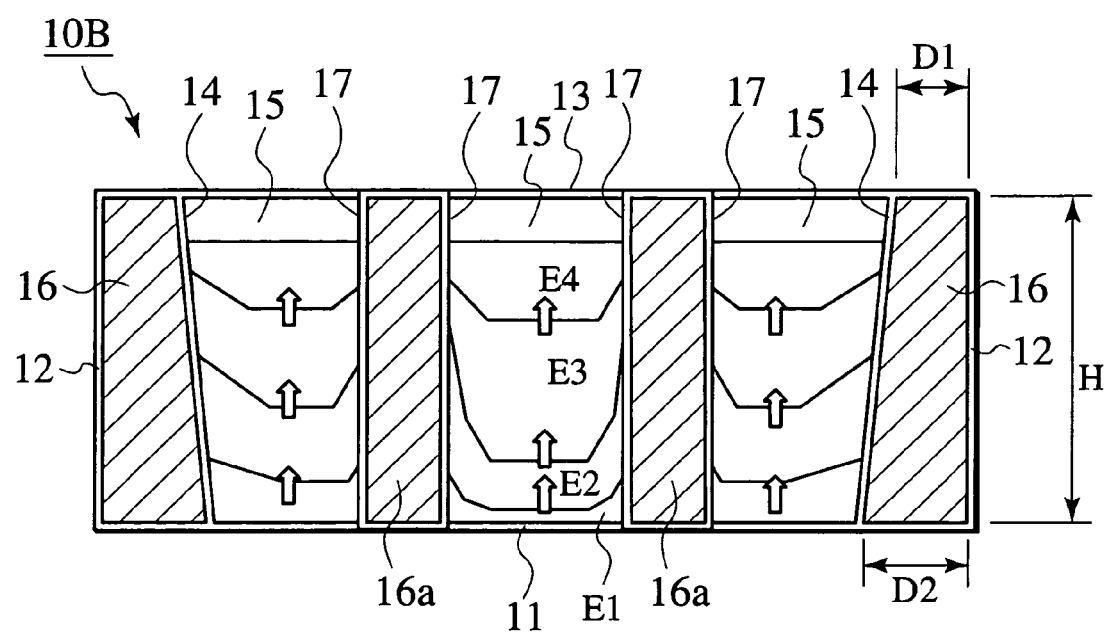
FIG. 8 is a sectional view showing a pure water tank according to a third embodiment of the present invention.

FIG. 8 is a sectional view showing a pure water tank 10B for a fuel cell system according to the third embodiment of the present invention. Compared with the pure water tank 10A of the second embodiment, the pure water tank 10B of the third embodiment has an antifreeze zone 16 whose width gradually increases from the top portion to the bottom portion thereof. Namely, a top width D1 of the antifreeze zone 16 gradually increases to a bottom width D2 thereof (D1<D2). The other arrangements of the third embodiment are the same as those of the second embodiment, and therefore, the same parts as those of the second embodiment are represented with like reference marks to avoid repetitive explanation.

The third embodiment applies the expression (1) to the width D1, i.e., the narrowest width of the antifreeze zone 16, to satisfy Dmin≦D1<D2. The third embodiment increases the volume of a lower part of the antifreeze zone 16, to thereby decrease the volume of a lower part of the pure water zone 15. This results in surely and quickly transferring the temperature of the lower part of the antifreeze zone 16 to the lower part of the pure water zone 15. Consequently, the pure water in the pure water zone 15 surely starts freezing from the bottom portion thereof. Namely, stress to be applied to the pure water tank 10B, when pure water at a lower part of the pure water zone 15 freezes, can surely be reduced.

The pure water tank 10B of the third embodiment is effective when the volume of the pure water zone 15 is greater than that of the second embodiment.

Although the above embodiments relate to fuel cell systems installed in electric vehicles, the present invention is also applicable to fuel cell systems for home use.

Effect of the Present Invention

When an ambient temperature drops below an ice point, the temperature of an outer face of the pure water tank according to the present invention decreases and the temperature of an inner side of the antifreeze zone becomes relatively higher. The lower temperature on the outer side of the antifreeze zone causes antifreeze on the outer side to descend, and the higher temperature on the inner side of the antifreeze zone causes antifreeze on the inner side to ascend, thereby producing a natural convection of antifreeze. A temperature distribution based on the natural convection of antifreeze is transferred to pure water in the pure water zone in the pure water tank, so that the pure water in the pure water zone may have a temperature distribution involving a high-temperature upper part and a low-temperature lower part. As a result, the pure water in the pure water zone starts to freeze from the bottom portion thereof, and the top portion of the pure water freezes later. Namely, when pure water at a lower part of the pure water tank freezes, it can swell upward. This reduces stress to be applied to the pure water tank when pure water at a lower part of the pure water tank freezes. This prevents the deformation or breakage of the pure water tank without increasing the wall thickness of the pure water tank. In other words, the wall thickness of the pure water tank can be thinned to reduce the size and weight of the pure water tank.

This application claims benefit of priority under 35USC §119 to Japanese Patent Applications No. 2003-092493, filed on Mar. 28, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A pure water tank for a fuel cell system, comprising:
   a pure water zone configured to hold pure water and to have an upper space being not filled with the pure water; and
   an antifreeze zone being secured on the outer side of the pure water zone and configured to hold antifreeze,
   wherein the antifreeze has a freezing point lower than a lowest temperature of a service temperature range of the pure water tank, the density thereof increasing as the temperature thereof decreases within the service temperature range, and
   wherein a width of the antifreeze zone between a side face of the antifreeze zone on the pure water zone side and an outer side face of the antifreeze zone is set according to a height of the antifreeze zone so that the pure water in the pure water zone may gradually freeze from the bottom portion thereof.

2. The pure water tank of claim 1, wherein:

the width of the antifreeze zone is set to be equal to or larger than a predetermined width; and the predetermined width increases as the height of the antifreeze zone increases and a variation in the predetermined width is proportional to a logarithm of the height of the antifreeze zone.

3. The pure water tank of claim 2, wherein a minimum value of the width of the antifreeze zone is set to be equal to or greater than the predetermined width.

4. The pure water tank of claim 3, wherein the width of the antifreeze zone is set to gradually increase from the top toward the bottom portion of the antifreeze zone.

* * * * *